United States Patent [19]

Bishop

[11] Patent Number: 4,735,659

[45] Date of Patent: Apr. 5, 1988

[54] COMPOSITIONS AND A PROCESS FOR PREPARING WATER DISPERSIBLE POLYMERS

[75] Inventor: Marshall D. Bishop, Bartlesville, Okla.

[73] Assignee: Phillips Petroleum Company, Bartlesville, Okla.

[21] Appl. No.: 897,490

[22] Filed: Aug. 18, 1986

[51] Int. Cl.$^4$ .............................. C08L 1/08; C08J 3/06
[52] U.S. Cl. ............................. 106/193 R; 106/209; 106/214; 524/493
[58] Field of Search ............... 106/189, 181, 169, 204, 106/193, 209, 214; 524/493, 503, 493

[56] References Cited

U.S. PATENT DOCUMENTS

| | | | |
|---|---|---|---|
| 3,251,814 | 5/1966 | Gentile | 260/80.3 |
| 3,637,564 | 1/1972 | Economou | 260/29.6 |
| 3,657,182 | 4/1972 | Jolly | 260/33.4 |
| 3,907,734 | 9/1975 | Ten Broeck | 524/493 |
| 4,312,675 | 1/1982 | Pickens et al. | 106/171 |
| 4,325,861 | 4/1982 | Braun et al. | 523/205 |
| 4,357,260 | 11/1982 | Sandford | 106/209 |
| 4,392,964 | 7/1983 | House et al. | 252/8.5 |
| 4,394,273 | 7/1983 | Hoff | 252/8.551 |
| 4,435,217 | 3/1984 | House | 106/171 |
| 4,453,979 | 6/1984 | DeMasi et al. | 106/188 |
| 4,481,328 | 11/1984 | Harreus | 524/493 |
| 4,499,214 | 2/1985 | Sortwell | 523/336 |
| 4,526,780 | 7/1985 | Marschner | 514/770 |

Primary Examiner—Theodore Morris
Attorney, Agent, or Firm—Hal Brent Woodrow

[57] ABSTRACT

Compositions of water soluble polymers coated with hydrophobic fumed silica are readily dispersed in water. A method for improving the water dispersibility of a water soluble polymer is disclosed.

22 Claims, No Drawings

COMPOSITIONS AND A PROCESS FOR PREPARING WATER DISPERSIBLE POLYMERS

This invention relates to compositions of water soluble polymers and a method of improving their dispersibility in water.

Water soluble high molecular weight polymers are conventionally utilized in the form of dilute aqueous solutions. Although the polymers as manufactured can be dispersed in water to provide homogeneous solutions, care must be exercised in achieving an initial dispersion of the polymer in water. Unless proper precautions are taken, the polymer is likely to agglomerate upon wetting with water to form partially hydrated agglomerated polymer which is slow to dissolve. Moreover, the agglomerated polymer has a tendency to plug liquid handling equipment. Although complete dissolution of the agglomerated polymer is possible its achievement may require extended periods of time or special treatments to promote rapid dissolution of the gels. Removal of the agglomerated polymer from solutions is also an alternative but is wasteful of polymer.

Thus a process for readily dispersing such polymers would represent a significant contribution to the art.

It is thus an object of this invention to provide a novel polymer (i.e. composition) that is more readily dispersed in water. Another object of this inention is to provide a method for improving the dispersibility of a water soluble high molecular weight polymer in water.

Other aspects and objects of this invention will become apparent hereinafter as the invention is more fully described.

In accordance with the present invention, I have discovered that water soluble high molecular weight polymers having improved water dispersibility are obtained when the particulate polymer is contacted with hydrophobic fumed silica in such a manner that the individual particles of polymer are coated with hydrophobic fumed silica.

Water soluble polymers which are suitable for use in the invention are well known in the art. The polymer should be in its solid state and in general be of a particle size with a diameter in the range of 1 to 1,000 microns.

Such water soluble polymers are selected from the group consisting of the cellulose ethers, starches, gums, vinyl polymers, acrylic polymers, and biopolysacharides.

Examples of suitable cellulose ethers are those selected from the group consisting of carboxymethylcellulose, methylcellulose, carboxymethylhydroxyethylcellulose, hydroxypropylmethylcellulose, hydroxypropylcellulose, hydroxyethylcellulose, ethylhydroxycellulose, and the like.

Examples of suitable starches include those selected from the group consisting of carboxymethylstarch, hydroxyethylstarch, and hydroxypropylstarch.

Examples of suitable gums are those selected from the group consisting of arabic, trajacanth, karaya, shatti, locust bean, guar, psyllium seed, quince seed, agar, algin, carrageenin, furcellaran, pectin, gelatin, and larch gum.

Examples of suitable acrylic polymers are those selected from the group consisting of polyacrylic acid, polyacrylamide, acrylamide-acrylic acid, acrylamide-methacrylic acid and acrylonitrile.

Examples of suitable vinyl polymers are those selected from the group consisting of polyvinylpyrrolidone, polyvinyl alcohol, and carboxyvinyl polymers.

The biopolymers useful in this invention are biopolymers produced by a process comprising the microbial transformation of a carbohydrate with a microorganism to obtain a polymeric material which differs from the parent polymeric material in respect of composition, properties and structure. Suitable carbohydrates include sugars such as pentoses or hexoses, for example glucose, sucrose, fructose, maltose, lactose, galactose, and starches, for example soluble starch, corn starch and the like. Crude products having a high carbohydrate concentration can be used. Among suitable materials there may be mentioned raw sugar, crude molasses and the like. Microogranisms suitable for effecting the microbial transformation of the carbohydrates may be for example plant pathogenic bacteria such as plant pathogens which produce exudates on the site of lesions on infected plants. Typical of such microorganisms are the species of the genus Xanthomonas. Thus, for example a heteropolysaccharide biopolymer may be prepared from glucose by the action of *Xanthomonas campestris* (XC polymer). Commercially available xanthan gum biopolymers can be obtained from Kelco Div., Merck & Co., Inc. under the trademark of "Kelzan" and General Mills, Inc. under the trademark "Biopolymer XB 23". Other species of Xanthomonas bacteria which are useful in preparing the biopolymers include *Xanthomonas phaseoli, Xanthomonas mulvacearn, Xanthomonas carotae, Xanthomonas translucens, Xanthomonas hederae* and *Xanthomonas papavericoli*. Other biopolymers, so-called synthethic gums, which are useful in this invention: gum dextran synthesized by the action of the bacterium known as genus Leuconostoc Van Tieghemend on sucrose, as described by Bailey et al. in U.S. Pat. No. 2,360,237, phosphorylated mannan synthesized by the action of the yeast *Hansenula holstii* NRRL-Y2448 on glucose as disclosed in U.S. Dept. of Agriculture, Agricultural Research Service, Northern Utilization Research and Development Division, Peoria, Ill., Bulletin CA-N-7, October, 1958; gums produced by the action of diphtheriodic bacteria such as *Arthrobacter viscous* NRRL B-1973 and *Arthrobacter viscous* NRRL B-1797 as disclosed in Cadmus et al. U.S. Pat. No. 3,228,855; gum produced by the action of *Methylomonas mucosa* as described in Finn et al. U.S. Pat. No. 3,923,782; gum produced by the action of *Erwinia tahitica* as disclosed in Kang et al. U.S. Pat. No. 3,933,788; and gum produced by the action of *Azotobacter indicus* var. Myxogenes as disclosed in Kang et al. U.S. Pat. No. 3,960,832.

Examples of suitable biopolysacharides include those selected from the group consisting of a polysachride produced by the action of *Xanthomonas campestris, Xanthomonas phaseoli, Xanthomonas mulvacearn, Xanthomonas carotae, Xanthomonas translucens, Xanthomonas hederae, Xanthomonas papavericoli, Hansenula holstii, Arthrobacter viscous, Methylomonas mucosa, Erwinia tahitica* and *Azotobacter indicus*.

In addition to the water soluble polymer, the novel composition also contains hydrophobic fumed silica. Such silica can be prepared by the combustion of silicon tetrachloride in hydrogen-oxygen furnaces. The reaction product, silicon dioxide, is rendered hydrorphobic by treatment with a silane. In the preferred embodiment the hydrophobic fumed silica should have a surface area of 100 $m^2$/g.

Blending of the chosen water soluble polymer with hydrophobic fumed silica can be carried out in any manner so long as the particles are coated with the hydrophobic fumed silica.

The concentration of hydrophobic fumed silica in the final composition should be in the range of 0.1–10 weight percent, preferably 1–2% if the polymer is a cellulose ether, a starch, a vinyl polymer or an acrylic polymer. The preferred range is 2.5–3.5% if the polymer used is a gum or biopolysacharide.

The resulting composition of the present invention will readily dissolve in water producing a translucent solution. However, if a clear aqueous solution is desired there can be optionally added a surfactant to the solution. Generally, such surfactants are employed in an amount in the range of 0.1 to 5 weight percent. Examples of suitable surfactants are those selected from the group consisting of long chain amines, alkali metal salts of alkyl-aryl sulfonic acids, alkali salts of short chain petroleum sulfonic acids, ammonium soaps, amine soaps, and alkali metal soaps.

The following examples further illustrate the invention.

EXAMPLE I

The purpose of this example was to determine if the composition would cause polymers of the cellulose ether family to readily dissolve on contact with water. A sample was prepared by mixing 50 grams carboxymethyl cellulose with sufficient hydrophobic fumed silica so that the final concentration of silica was 2 weight percent. Another sample was prepared by mixing 50 grams carboxymethylhydroxyethyl cellulose with sufficient hydrophobic fumed silica to achieve a 2 weight percent concentration of silica.

These treated samples were compared with two untreated samples of polymer by mixing one gram of each in 250 ml of cold water and mechanically stirring for 30 seconds. At the end of 30 seconds, both of the cellulose ethers that had been treated with hydrophobic fumed silica were totally dissolved. The two samples of untreated polymer had not dissolved, but instead had formed agglomerated clumps in the bottom of the test containers.

EXAMPLE II

Two samples of polyacrylamide of differing particle size (Alcomer 120 and DSCO DBX) were dry blended with hydrophobic fumed silica to produce a composition having a final concentration of 2 weight percent hydrophobic fumed silica.

These samples were compared against an untreated sample of each polyacrylamide in the following manner. One gram of each was mixed with 250 ml of cold water and mechanically stirred for 40 seconds. Both of the polyacrylamide samples that had been treated with hydrophobic fumed silica were totally dissolved at the end of 40 seconds. Whereas, both of the untreated polyacrylamide samples were not dissolved at the end of 40 seconds and had agglomerated into clumps.

EXAMPLE III

The purpose of this example was to determine if the treatment of a biopolymer with hydrophobic fumed silica would result in the ready dispersion of the composition.

A sample was prepared by mixing a polysacharide that had been produced by *Xanthomonas campestris* with hydrophobic fumed silica in an amount to yield a composition having final concentration of 3 weight percent hydrophobic fumed silica.

The treated sample of polymer was compared against an untreated sample of the same polymer. One gram of each was mixed with 280 ml of cold water and mechanically stirred for 30 seconds.

The treated composition had totally dissolved while the untreated sample had agglomerated into a large clump in the bottom of the test container.

The foregoing examples clearly demonstrate that the coating of a cellulose ether, gum, starch, vinyl polymer, acrylic polymer, or biopolysacharide with hydrophobic fumed silica in accordance with the present invention results in polymeric compositions having improved dispersibility in water.

As will be evident to those skilled in the art, many variations and modifications of this invention can be made in view of the foregoing disclosure without departing from the spirit and scope of the invention.

I claim:

1. A water dispersible particular polymeric composition; comprising by weight 90–99.95 water soluble polymer and 0.1–10% hydrophobic fumed silica; wherein said hyrdophobic fumed silica is present on the surface of said particulate polymeric composition; wherein said water soluble polymer is chosen from the group consisting essentially of:

(a) cellulose ethers;
(b) gums;
(c) starches;
(d) vinyl polymers;
(e) acrylic polymers and;
(f) biopolysacharides.

2. A composition according to claim 1, wherein said cellulose ethers are selected from the group consisting of carboxymethylcellulose, methylcellulose, hydroxypropylmethylcellulose, hydroxypropylcellulose, hydroxyethylcellulose, ethylhydroxycellulose, and carboxymethyldroxyethylcellulose.

3. A composition according to claim 2, wherein said cellulose ether is carboxymethylcellulose.

4. A composition according to claim 2 wherein said cellulose ether is carboxymethylhydroxyethylcellulose.

5. A composition according to claim 1, wherein said starches are selected from the group consisting of carboxymethyl starch, hydroxyethyl starch, and hydroxypropyl starch.

6. A composition according to claim 1, wherein said gums are selected from the group consisting of arabic, trajacanth, karaya, shatti, locust bean, guar, psyllium seed, quince seed, agar, algin, carrageenin, furcellaran, pectin, gelatin, and larch gum.

7. A composition according to claim 1, wherein said vinyl polymer is chosen from the group consisting of polyvinyl pyrrolidone, polyvinyl alcohol, and carboxyvinyl polymers.

8. A composition according to claim 1, wherein said acrylic polymer is chosen from the group consisting of polyacrylic acid, polyacrylamide, acrylamide-acrylic acid, acrylamide-methacrylic acid, and acrylonitrile.

9. A composition according to claim 8 wherein said acrylic polymer is polyacrylamide.

10. A composition according to claim 1, wherein said biopolysacharide is chosen from the group consisting of a polysacharide produced by the action of *Xanthomonas campestris, Xanthomonas phaseoli, Xanthomonas mulvacearn, Xanthomonas carotae, Xanthomonas translucens,*

*Xanthomonas hederae, Xanthomonas papavericoli, Hansenula holstii, Arthrobacter viscous, Methylmonas mucosa, Erwinia tahitica,* and *Azotobacter indicus.*

11. A composition according to claim 10, wherein said polysacharide is produced by *Xanthomonas campestris.*

12. A method for improving the water dispersibility of water soluble polymers which comprises:
   (a) contacting a particulate water soluble polymer selected from the group consisting of cellulose ethers, starches, gums, vinyl polymers, acrylic polymers, and biopolysacharides with from 0.1–10 weight percent hydrophobic fumed silica so that the individual particles of said water soluble polymer are coated with said hydrophobic fumed silica.

13. The method of claim 12, wherein said cellulose ether is selected from the group consisting of carboxymethylcellulose, methylcellulose, hydroxypropylmethylcellulose, hydroxypropylcellulose, hydroxyethylcellulose, ethylhydroxycellulose, and carboxymethylhydroxyethylcellulose.

14. The method of claim 13 wherein said cellulose ether is carboxymethylcellulose.

15. The method of claim 13 wherein, said cellulose ether is carboxymethyldroxyethylcellulose.

16. The method of claim 12 wherein, said starch is selected from the group consisting of carboxymethylstarch, hydroxyethylstarch, and hydroxypropylstarch.

17. The method of claim 12, wherein said gum is selected from the group consisting of arabic, trajacanth, karaya, shatti, locust bean, guar, psyllium seed, quince seed, agar, algin, carrageenin, furcellaran, pectin, gelatin, and larch gum.

18. The method of claim 12, wherein said vinyl polymer is chosen from the group consisting of polyvinylpyrrolidone, polyvinyl alcohol, and carboxyvinyl polymers.

19. The method of claim 12, wherein said acrylic polymer is chosen from the group consisting of polyacrylic acid, polyacrylamide, acrylamide-acrylic acid, acrylamide-methacrylic acid, and acrylonitnrile.

20. The method of claim 19, wherein said acrylic polymer is polyacrylamide.

21. The method of claim 12 hwerein said biopolysacharide is selected from the group consisting of a polysacharide produced by the action of *Xanthomonas campestris, Xanthomonas phaseoli, Xanthomonas mulvacearn, Xanthomonas carotae, Xanthomonas translucens, Xanthomonas hederae, Xanthomonas papavericoli, Hansenula holstii, Arthrobacter viscous, Methylmonas mucosa, Erwinia tahitica,* and *Azotobacter indicus.*

22. The method of claim 21, wherein said polysacharide is produced by *Xanthomonas campestris.*

* * * * *

UNITED STATES PATENT AND TRADEMARK OFFICE
CERTIFICATE OF CORRECTION

PATENT NO. : 4,735,659

DATED : April 5, 1988

INVENTOR(S) : Marshall D. Bishop

It is certified that error appears in the above-identified patent and that said Letters Patent is hereby corrected as shown below:

Column 4, line 23, delete "99.95" and insert ---99.9%---.
Column 5, line 29, delete "carboxymethyldroxyethylcellulose" and
  insert ---carboxymethylhydroxyethylcellulose---.

Signed and Sealed this

Twenty-third Day of August, 1988

Attest:

DONALD J. QUIGG

Attesting Officer

Commissioner of Patents and Trademarks